US012694345B2

(12) United States Patent
Appel et al.

(10) Patent No.: US 12,694,345 B2
(45) Date of Patent: Jul. 28, 2026

(54) MODEL-TIERING MACHINE LEARNING MODEL

(71) Applicant: INTERNATIONAL BUSINESS MACHINES CORPORATION, Armonk, NY (US)

(72) Inventors: Ana Paula Appel, São Paulo (BR); Paulo Rodrigo Cavalin, Rio de Janeiro (BR); Graziella Martins Caputo, Katy, TX (US); Paula Fernanda Pereira, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 18/134,059

(22) Filed: Apr. 13, 2023

(65) Prior Publication Data

US 2024/0346387 A1     Oct. 17, 2024

(51) Int. Cl.
  *G06N 20/20*         (2019.01)
(52) U.S. Cl.
  CPC ................................... *G06N 20/20* (2019.01)
(58) Field of Classification Search
  CPC ................................ G06N 20/20; G06N 3/08
  See application file for complete search history.

(56) References Cited

U.S. PATENT DOCUMENTS

| | | | |
|---|---|---|---|
| 9,552,548 B1 | 1/2017 | Brestoff | |
| 9,563,782 B1 | 2/2017 | Brisebois et al. | |
| 9,779,236 B2 | 10/2017 | Abrams et al. | |
| 10,671,854 B1 | 6/2020 | Mahyar et al. | |
| 11,140,446 B2 | 10/2021 | Pau et al. | |
| 11,151,479 B2 | 10/2021 | Chu et al. | |
| 2017/0286870 A1 | 10/2017 | Hoover et al. | |
| 2018/0091625 A1* | 3/2018 | Hwang | H04L 41/0897 |
| 2018/0232835 A1* | 8/2018 | Gordon | G06Q 30/0627 |
| 2019/0037040 A1 | 1/2019 | Kasaragod et al. | |
| 2019/0156256 A1* | 5/2019 | Argyros | G06F 40/30 |
| 2019/0207968 A1* | 7/2019 | Heckman | H04L 63/1433 |
| 2020/0089848 A1 | 3/2020 | Abdelaziz et al. | |
| 2021/0173711 A1 | 6/2021 | Crabtree et al. | |

(Continued)

OTHER PUBLICATIONS

Barrett et al., "Actionable Guidance for High-Consequence AI Risk Management: Towards Standards Addressing AI Catastrophic Risks," Feb. 23, 2023, https://arxiv.org/abs/2206.08966.*

(Continued)

*Primary Examiner* — Ryan Barrett
(74) *Attorney, Agent, or Firm* — Seed Intellectual Property Law Group LLP

(57)         ABSTRACT

A method, system, and computer program product are configured to: receive an input machine learning model being developed for deployment in a production environment; create a feature vector based on metadata of the input machine learning model and a data source used by the input machine learning model; determine a risk tier of the input machine learning model by classifying the input machine learning model into one of plural predefined tiers using the feature vector with a model-tiering machine learning model; and provide validation information to an evaluator wherein the validation information is based on the risk tier and is used to validate the input machine learning model in accordance with the risk tier.

20 Claims, 4 Drawing Sheets

(56)                    References Cited

U.S. PATENT DOCUMENTS

| | | | |
|---|---|---|---|
| 2021/0326881 A1* | 10/2021 | Handelman | G06F 40/30 |
| 2021/0357808 A1* | 11/2021 | Tsuyuki | G06F 18/2178 |
| 2022/0076165 A1 | 3/2022 | Minkin et al. | |
| 2022/0237103 A1* | 7/2022 | Agrawal | G06Q 40/00 |
| 2022/0253443 A1 | 8/2022 | Gold et al. | |
| 2022/0318901 A1 | 10/2022 | McKenna et al. | |
| 2023/0206254 A1* | 6/2023 | Truong | G06Q 30/0201 |
| | | | 705/7.29 |
| 2025/0322244 A1* | 10/2025 | Mysore | G06F 11/3684 |

OTHER PUBLICATIONS

NIST, "Artificial Intelligence Risk Management Framework (AI RMF 1.0)," Jan. 2023, https://doi.org/10.6028/NIST.AI.100-1 https://nvlpubs.nist.gov/nistpubs/ai/nist.ai.100-1.pdf.*
Frydman et al., "Automating Risk Analysis of Software Design Models," Jun. 18, 2014, https://pmc.ncbi.nlm.nih.gov/articles/PMC4090456/.*

Anonymous, "Quantifying risk in operationalizing ML models", IP.com No. IPCOM000258892D, Jun. 22, 2019, 5 pages.
Kiritz et al., "Model risk tiering: an exploration of industry practices and principles", https://www.risk.net/journal-of-risk-model-validation/6710566/model-risk-tiering-an-exploration-of-industry-practices-and-principles, Mar. 2007, 42 pages.
Crespo et al., "The evolution of model risk management", https://www.mckinsey.com/capabilities/risk-and-resilience/our-insights/the-evolution-of-model-risk-management, Feb. 2017, 8 pages.
Cernuschi, "Model Risk and Internal Validation: developing the new framework", Jun. 20, 2019, 22 pages.
Jaekel et al., "Risk Assessment for Artificial Intelligence Applications in Manufacturing", Oct. 17, 2022, 30 pages.
Fornell, "FDA has now cleared more than 500 healthcare AI algorithms", https://healthexec.com/topics/artificial-intelligence/fda-has-now-cleared-more-500-healthcare-ai-algorithms, Feb. 6, 2023, 8 pages.
Anonymous, "Model Risk Management of AI and Machine Learning Systems", archived on Apr. 12, 2023, 28 pages.

* cited by examiner

100

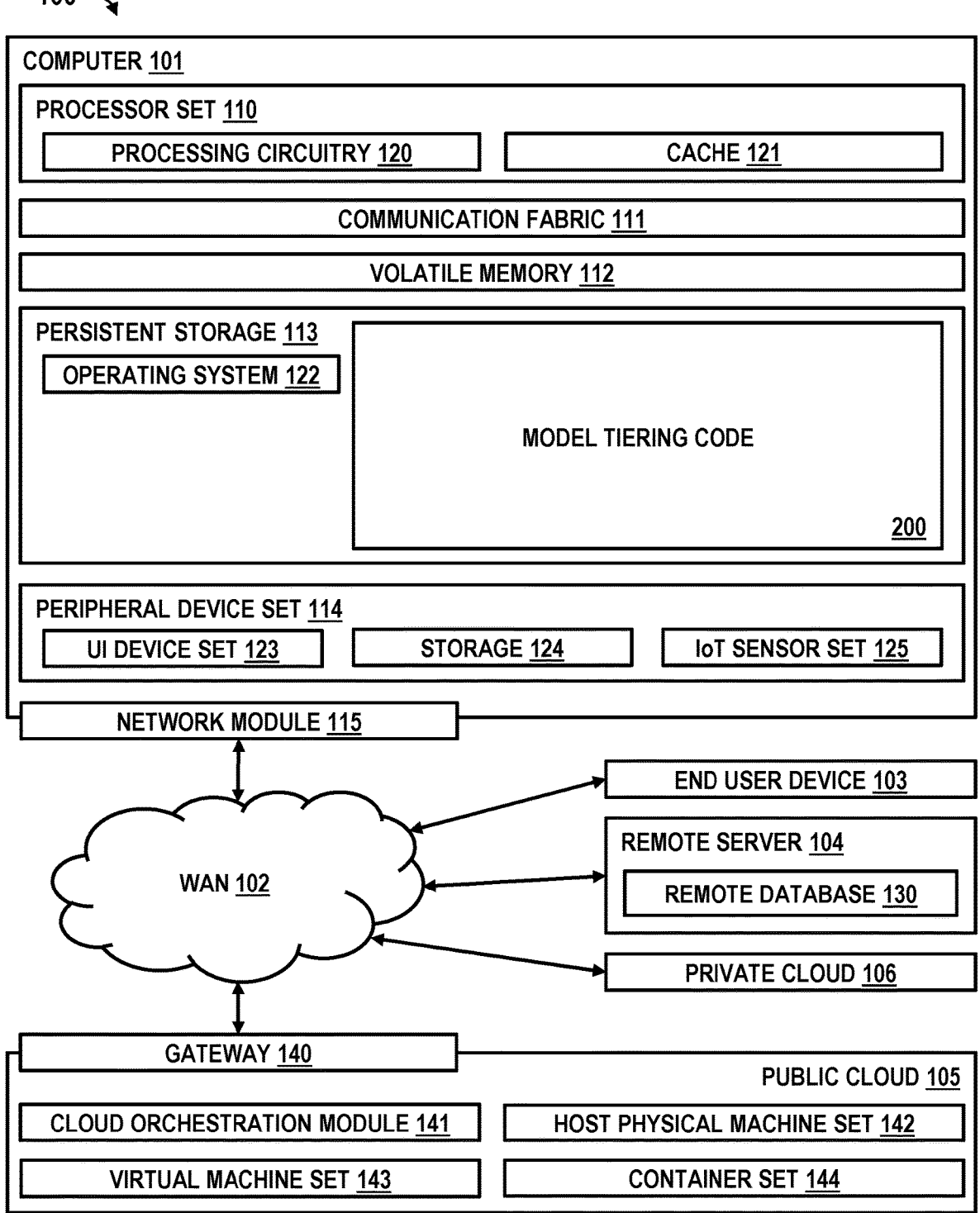

COMPUTER 101

PROCESSOR SET 110

PROCESSING CIRCUITRY 120    CACHE 121

COMMUNICATION FABRIC 111

VOLATILE MEMORY 112

PERSISTENT STORAGE 113

OPERATING SYSTEM 122

MODEL TIERING CODE

200

PERIPHERAL DEVICE SET 114

UI DEVICE SET 123    STORAGE 124    IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141    HOST PHYSICAL MACHINE SET 142

VIRTUAL MACHINE SET 143    CONTAINER SET 144

FIG. 1

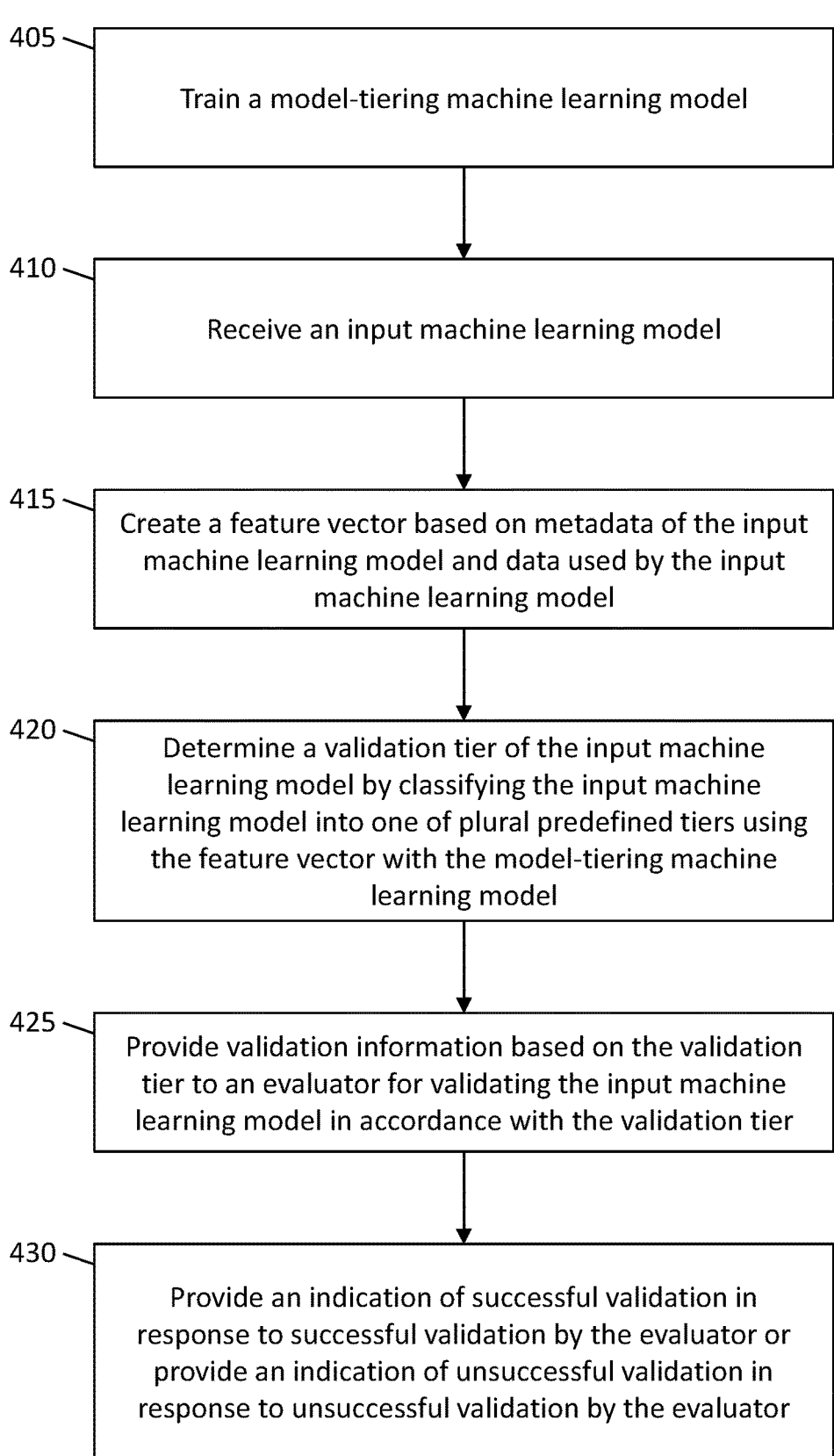

405 — Train a model-tiering machine learning model

410 — Receive an input machine learning model

415 — Create a feature vector based on metadata of the input machine learning model and data used by the input machine learning model 420 — Determine a validation tier of the input machine learning model by classifying the input machine learning model into one of plural predefined tiers using the feature vector with the model-tiering machine learning model 425 — Provide validation information based on the validation tier to an evaluator for validating the input machine learning model in accordance with the validation tier 430 — Provide an indication of successful validation in response to successful validation by the evaluator or provide an indication of unsuccessful validation in response to unsuccessful validation by the evaluator

FIG. 4

MODEL-TIERING MACHINE LEARNING MODEL

BACKGROUND

Aspects of the present invention relate generally to machine learning models and, more particularly, to automatically categorizing machine learning models into risk tiers using a model-tiering machine learning model.

Machine learning models are used in several industry sectors, such as finance, health, telecom, etc. As the use of machine learning models continues to grow in business practices, the need for model risk management increases. Prior to deploying a machine learning model in a production environment, model risk management activities include categorizing the model according to a classification called a tier (also called a risk tier) and validating the model in accordance with rules defined by or for the tier. Different tiers indicate different priorities for evaluating and deploying a model and may also indicate different levels of risk or sensitive data. For example, model risk managers may use model risk tiers to schedule validation activities and determine their scope. Even more specifically, a model's risk tier may dictate the breadth, depth, priority, and frequency of validation activities, such as review of documentation, developmental data and/or performance testing. Similarly, a model's risk tier may dictate the extent of model validation testing, such as backtesting, benchmarking, sensitivity testing, stability testing or others.

A problem exists in conventional model risk management practices in which a model owner or developer classifies their model in a tier and the model is evaluated based on this classification. Such manual classification is susceptible to errors due to human oversight, bias, etc. A model that is inaccurately classified may undergo an insufficient validation based on being classified in the wrong tier, and this can create risk of business, credibility, and reputation harm for the entity that deploys the model.

SUMMARY

In accordance with aspects of the invention, a method, system, and computer program product are configured to: receive an input machine learning model being developed for deployment in a production environment; create a feature vector based on metadata of the input machine learning model and a data source used by the input machine learning model; determine a risk tier of the input machine learning model by classifying the input machine learning model into one of plural predefined tiers using the feature vector with a model-tiering machine learning model; and provide validation information to an evaluator wherein the validation information is based on the risk tier and is used to validate the input machine learning model in accordance with the risk tier. In this manner, implementation of the invention advantageously provide for automated artificial intelligence (AI) based tiering of the input machine learning model.

In embodiments, the creating the feature vector comprises one or more selected from a group consisting of: determining one or more techniques used by the input machine learning model by analyzing the metadata; determining one or more areas of use of the input machine learning model by analyzing the metadata and the data source; identifying information in a knowledge base that is related to using the input machine learning model; identifying information in a regulation that is related to using the input machine learning model; and identifying a type of sensitive information in the data source and used by the input machine learning model. In embodiments, the creating the feature vector comprises including, in the feature vector, content based on one or more of the techniques, the areas of use, the information in the knowledge base, the information in the regulation, and the type of sensitive information. In this manner, implementations of the invention advantageously create the feature vector, and thus classify the input machine learning model, based on internal and external regulations, metadata, input data, and whether the data contains sensitive information.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 4 shows a flowchart of an exemplary method in accordance with aspects of the present invention.

DETAILED DESCRIPTION

Figure 2:
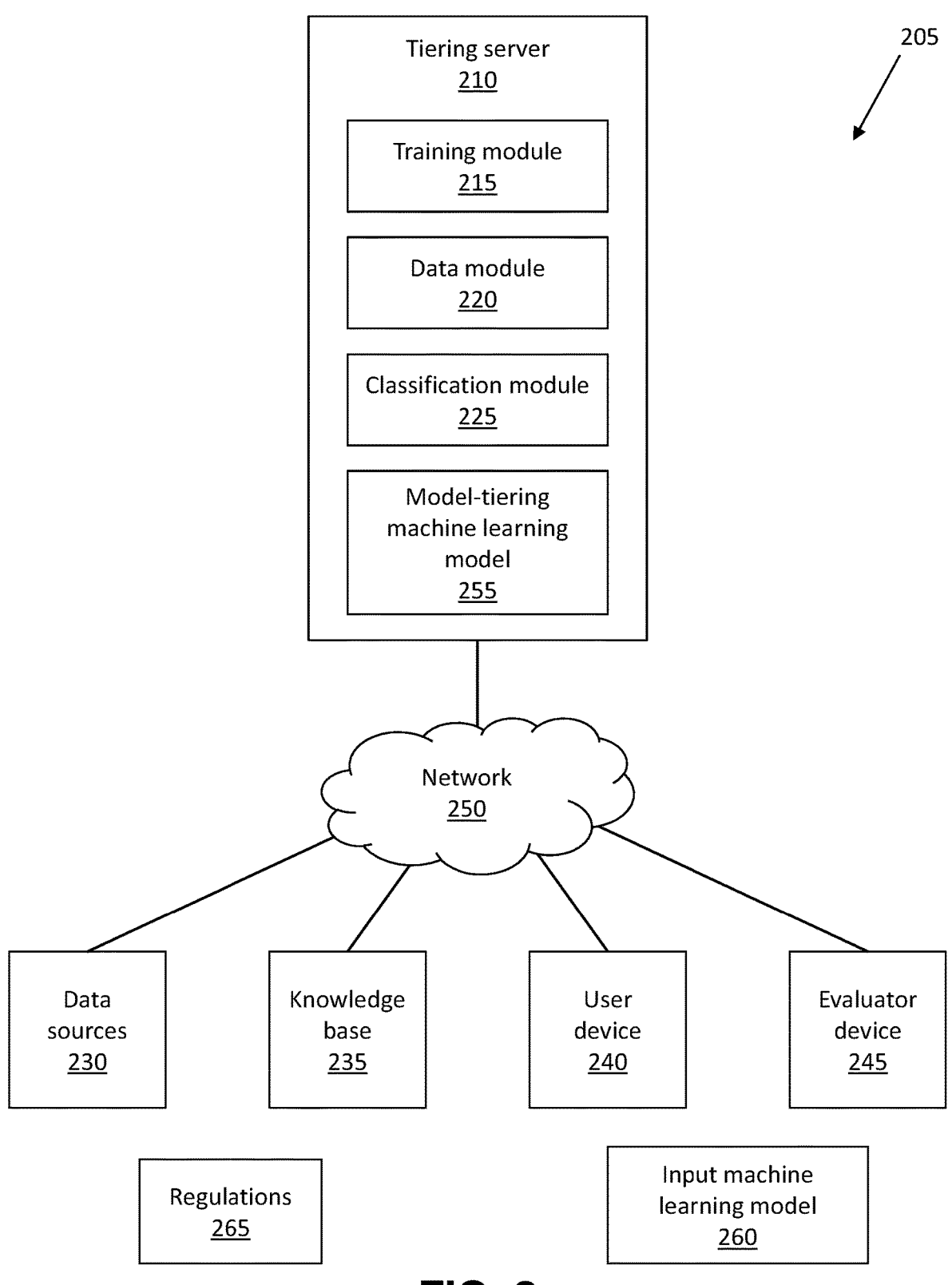
FIG. 2 shows a block diagram of an exemplary environment in accordance with aspects of the present invention.

Aspects of the present invention relate generally to machine learning models and, more particularly, to automatically categorizing machine learning models into risk tiers using a model-tiering machine learning model. Implementations of the invention perform automated model tiering using a model-tiering machine learning model that categorizes an input machine learning model into one of plural risk tiers according to internal or external business and/or security and privacy requirements. Embodiments use the model-tiering machine learning model to output a most appropriate tier for an input machine learning model. In embodiments, the model-tiering machine learning model generates the output using various information as features, the information including but not limited to internal and external regulations, metadata, input data, and whether the data contains sensitive information.

With the increase of use of machine learning models in companies across different sectors, such as banking and health, an automated method for model tiering helps speed up the process of understanding the model and associated data and matching those inputs to internal and external regulations. For example, while some models may require faster evaluation based on their tiering, other models may require a more careful inspection to mitigate problems in more risky applications. Implementations of the invention provide a technical solution to the problem of inaccurate manual classification (e.g., tiering) of machine learning models. In embodiments, a solution includes utilizing a model-tiering machine learning model that classifies an input machine learning model as one of plural predefined tiers (e.g., risk tiers). A model-tiering machine learning model in accordance with aspects of the invention eliminates human error (e.g., oversight, bias, etc.) that is present in manual classification and, thus, provides an improvement in the field of machine learning models.

Implementations of the invention are necessarily rooted in computer technology. For example, the steps of training a model-tiering machine learning model and classifying an input machine learning model into one of plural predefined tiers using the model-tiering machine learning model are computer-based and cannot be performed in the human mind. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

It should be understood that, to the extent implementations of the invention collect, store, or employ personal information provided by or obtained from individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as model tiering code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment 205 includes a tiering server 210, data sources 230, knowledge base 235, user device 240, evaluator device 245, and network 250.

The tiering server 210 may comprise one or more instances of the computer 101 of FIG. 1. In another example, the tiering server 210 may comprise one or more virtual machines or containers running on one or more instances of the computer 101 of FIG. 1. In embodiments, the tiering server 210 communicates with the data sources 230, the knowledge base 235, the user device 240, and the evaluator device 245 via the network 250, which may comprise the WAN 102 of FIG. 1. In embodiments, the data sources 230 comprise one or more data sources each comprising an instance of remote database 130 of FIG. 1. In embodiments, the knowledge base 235 comprises one or more knowledge bases each comprising an instance of remote database 130 of FIG. 1. In embodiments, the user device 240 and the evaluator device 245 each comprise an instance of the end user device 103 of FIG. 1. There may be plural different instances of the user device 240 and the evaluator device 245 used by different users and evaluators, respectively.

In embodiments, the tiering server 210 of FIG. 2 comprises a training module 215, data module 220, and classification module 225, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The tiering server 210 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the training module 215 trains a model-tiering machine learning (MTML) model 255 that is usable by the classification module 225 to classify an input machine learning (IML) model 260 into a predefined tier (e.g., risk tier). In embodiments, the training module 215 trains the MTML model 255 using supervised learning with labeled training data. In embodiments, the labeled training data comprises plural data pairs each comprising a feature vector and label for a respective one of plural historic machine learning models. The feature vector for a respective data pair may be created using the data module 220 in the manner described herein. The label for a respective data pair may be obtained from human input, e.g., by an expert via the user device 240 or the evaluator device 245. In embodiments, the label for a respective data pair is one of plural predefined tiers (e.g., risk tiers) for a machine learning model. For example, the plural predefined tiers may consist of a set including a low risk tier, a moderate risk tier, and a high risk tier. In embodiments, the training module 215 uses the labeled training data and one or more machine learning training algorithms to train the MTML model 255 such that the MTML model 255 receives a feature vector as an input and, based on that input, outputs one of the plural predefined tiers. In this manner, the training module 215 trains the MTML model 255 to classify a feature vector (e.g., input) with one of the plural predefined tiers (e.g., output).

In one example, the MTML model 255 comprises an artificial neural network and the training module 215 trains the MTML model 255 using the labeled training data and one or more neural network training algorithms. These algorithms may include, for example, backpropagation or stochastic gradient descent techniques. In another example, the MTML model 255 comprises an XGBoost (eXtreme Gradient Boosting) model, which is a scalable, distributed gradient-boosted decision tree (GBDT) machine learning model. In this example, the training module 215 trains the MTML model 255 using the labeled training data and one or more gradient-boosted decision tree training algorithms. These algorithms may involve training models in succession, with each new model being trained to correct the errors made by the previous ones and where new models are trained to predict the residuals of prior models. The MTML model 255 is not limited to the examples of artificial neural network and XGBoost models and instead may comprise other classification-type machine learning models.

In accordance with aspects of the invention, the tiering server 210 is configured to use the trained MTML model 255 to automatically classify the IML model 260 with one of the plural predefined tiers. In this manner, the tiering server 210 performs AI (artificial intelligence) based model tiering. In embodiments, the tiering server 210 performs the AI-based model tiering by analyzing the IML model 260 itself, data accessed by the model, and metadata associated with the model. In embodiments, the tiering server 210 converts features extracted from the data and metadata to a common format that can be matched with rules and regulations in structured and/or unstructured format. In embodiments, a feature vector includes the converted features extracted from the data and metadata and additional information such as data distribution and the user of sensitive data. In embodiments, the feature vector is provided as an input to the MTML model 255 which generates an output of a classification of the IML model 260 into the most appropriate model tier.

In accordance with aspects of the invention, the data module 220 is configured to create a feature vector for the IML model 260. In embodiments, the data module 220 creates the feature vector based on: metadata of the IML model 260; data sources 230 used by the IML model 260; and information from the knowledge base 235 and regulations 265. In embodiments, the data module 220 creates the feature vector using feature extraction techniques such as embedding, for example.

In accordance with aspects of the invention, the classification module 220 is configured to use the feature vector with the MTML model 255 to determine a classification of the IML model 260 into one of the predefined tiers. In embodiments, the classification module 220 outputs the determined classification to an evaluator via the evaluator device 245, and the evaluator evaluates (e.g., validates) the IML model 260 based on the determined tier.

Figure 3:
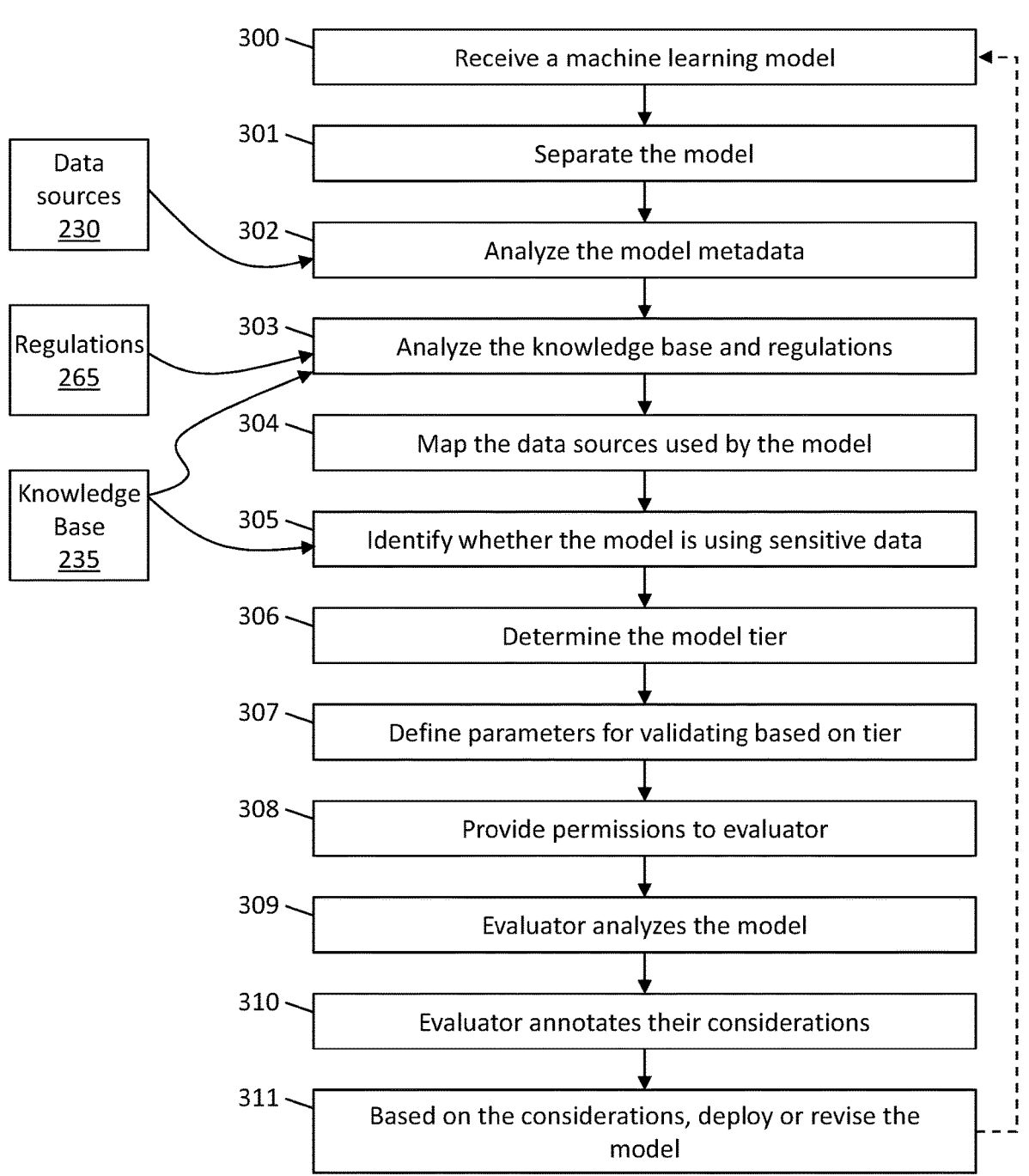
FIG. 3 shows a flowchart of an exemplary method in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At block 300, the tiering server 210 of FIG. 2 receives the IML model 260 of FIG. 2 to be classified into one of plural predefined tiers. In embodiments, the tiering server 210 receives the IML model 260 from the user device 240 or the evaluator device 245. In one example, the tiering server 210 receives data defining the IML model 260. In another example, the tiering server 210 receives data defining a network location that stores data defining the IML model 260 and the tiering server 210 obtains the model 250 from the network location. In embodiments, the IML model 260 is a machine learning model that has been developed (e.g., by a data scientist) and that must undergo validation prior to being used in a production environment (e.g., with real customers).

At block 301, the tiering server 210 starts to analyze the IML model 260. In embodiments, the tiering server 210 comprises a platform that analyzes the IML model 260. In embodiments, the data module 220 separates the IML model 260 into pieces including but not limited to: data sources (e.g., test, training, validation, etc.), metadata, and code. In embodiments, the IML model 260 comprises a script that can be separated into the different pieces according to components of the script.

At block 302, the data module 220 analyzes the model metadata to determine what techniques the model uses and what areas the model is used in. In embodiments, the metadata includes documenting data associated with the IML model 260 and the data sources 230 used by the IML model 260, and may include for example and without limitation: comments in the code of the model; readme files of the model; data dictionaries of the data sources used by the model; code books of the data sources used by the model; descriptions of fields of the data sources used by the model; administrative metadata describing who owns the data in the data sources used by the model and who can use the data under what conditions; and technical metadata describing technical considerations and requirements for working with the data in the data sources used by the model. In embodiments, analyzing the metadata at block 302 includes extracting features from the metadata. In one aspect, the extracted features relate to what techniques the IML model 260 uses, such as natural language processing, image processing, transactional processing, chatbot, etc. In another aspect, the extracted features relate to what areas the IML model 260 is used in, such as if the IML model 260 used for credit evaluation, risk analysis, client profiles, user identification in an agency, fraud detection, recommendations, healthcare exam analysis, healthcare diagnosis, healthcare image recognition, etc. In embodiments, the data module 220 extracts these features from the metadata using one or more text-based feature extraction algorithms. In embodiments, these extracted features may be included in the feature vector for this model 260.

At block 303, the data module 220 analyzes the knowledge base 235 to discover a business impact of the IML model 260 and other relevant information. In embodiments, the knowledge base 235 includes information about the entity (e.g., the business) that will use the IML model 260 in a production environment and how the IML model 260 will be used by that entity. In embodiments, the data module 220 analyzes the knowledge base 235 to identify additional information that is related to the metadata from block 302. For example, the metadata may include a name of a field in the data source 230, and at block 303 that data module 220 analyzes the knowledge base 235 to identify terms related to the name of the field in the data source 230 and to extract these terms as features for inclusion in the feature vector for this model 260.

Block 303 may also comprise analyzing regulations 265 that apply to the IML model 260. For example, entities such as banks and healthcare providers have different regulations that define rules that must be followed to provide safety to the customers of these entities. It is common for these regulations to define rules about how machine learning models can be used with customer data. In embodiments, the data module 220 analyzes the regulations 265 (e.g., using feature extraction) to identify features for inclusion in the feature vector of the IML model 260.

Block 303 may additionally comprise the data module 220 converting the extracted information to a common space. In embodiments, this comprises creating a feature vector for the IML model 260 using techniques such as embedding, where the feature vector and its contents are arranged in a format that is defined as the input for the MTML model 255. In this manner, the contents of the feature vector can be compared to data in the MTML model 255 and metrics such as similarity and matching scores can be computed.

At block 304, the data module 220 maps the data sources 230 used by the IML model 260. In embodiments, this comprises reading and accessing the code of the IML model 260 and analyzing the text (e.g., like a compiler) to identify marks of what code is being used to access the data sources 230. Metadata of the data sources 230 may also be used in block 304. The knowledge base 235 may also be used in block 304 to assist in interpreting information about the data sources 230.

At block 305, the data module 220 identifies whether the IML model 260 uses sensitive information from the data sources 230. Sensitive information may include personally identifiable information or other types of information that is not recommended to be used in certain applications. For example, sensitive information may include gender, age, postal code, etc. Sensitive information may be classified by type, such as public, internal-only, confidential, and restricted and in embodiments the data module 220 may determine a type of sensitive information included in the data sources 230 and used by the IML model 260 using metadata of the data sources 230. For example, a header or descriptor of each field in a data source 230 may include metadata that indicates a type of sensitive information included in the field. A type of sensitive information may also be determined by interpreting values in the data source 230 and combining this with information in the knowledge base 235. In embodiments, the data module includes, in the feature vector, content based on the identified type of sensitive information.

At block 306, the classification module 225 determines a tier of the IML model 260. In embodiments, the classification module 225 inputs the feature vector into the MTML model 255, which outputs a risk tier of the IML model 260 based on the input feature vector. Implementations may be based on a number of terms in the source code of the IML model 260 and/or data sources 230 and a total of parameters used by the IML model 260. Implementations may utilize data fusion to accommodate data from different sources. Such data fusion can utilize embedding, for example, to convert data from different sources to a common space. Implementations may utilize sequence-to-sequence models and deep learning to learn representations from the data when labeled or self-labeled datasets are available.

Still referring to FIG. 3, block 307 includes defining parameters for validating the IML model 260 based on the tier determined at block 306. In embodiments, the parameters for validating the model may be defied in validation information, which may comprise a timeline (e.g., deadline) to complete the validation and a scope of the validation. In embodiments, the scope of validation may include one or more of breadth, depth, priority, and frequency of validation activities. In embodiments, the validation activities may include one or more of review of documentation, review of developmental data, and performance and review of model validation testing such as backtesting, benchmarking, sensitivity testing, and stability testing.

Block 308 includes providing permissions to the evaluator performing the validation of the IML model 260. The permissions may include permissions to access certain data associated with the model for a time defined by the timeline (e.g., deadline) to complete the validation and the scope of the validation, e.g., from block 307.

At block 309, the evaluator analyzes the IML model 260. In embodiments, analyzing the model includes performing validation activities as described herein. This may comprise, for example, reviewing metrics and information generated by evaluation tools and other computations. This may also comprise, for example, one or more of reviewing documentation, reviewing developmental data, and performing and reviewing model validation testing such as backtesting, benchmarking, sensitivity testing, and stability testing.

At block 310, the evaluator annotates their considerations to the IML model 260. The considerations may include, amongst other information, the evaluator's indication of a successful validation or an unsuccessful validation for the IML model 260.

At block 311, the IML model 260 is deployed or sent for revision based on the considerations from block 310. For example, based on a successful validation, the IML model 260 may be deployed in the production environment. In another example, based on an unsuccessful validation, the IML model 260 may be returned to the developer for adjusting (e.g., fixing) the model, e.g., as indicated by the dashed line returning the process to block 300.

FIG. 4 shows a flowchart of an exemplary method in accordance with aspects of the present invention. Steps of the method may be carried out in the environment of FIG. 2 and are described with reference to elements depicted in FIG. 2.

At step 405, the system (e.g., server 210) trains a model-tiering machine learning model (e.g., MTML model 255). As described herein, the training may be performed using labeled training data. The training may comprise creating the labeled training data, wherein the labeled training data comprises plural data pairs each comprising a feature vector of a historic machine learning model and a label corresponding to one of plural predefined tiers. As described herein, the feature vector of a historic machine learning model used in the training data may be created in the same manner as is the feature vector of an input machine learning model, e.g., as described at FIGS. 2 and 3. As described herein, the model-tiering machine learning model may comprise a classification model that receives a feature vector as an input and that outputs one of the plural predefined tiers. In exemplary and non-limiting implementations, the model-tiering machine learning model comprises an artificial neural network model or an extreme gradient boost model.

At step 410, the system (e.g., server 210) receives an input machine learning model (e.g., IML model 260). In embodiments, and as described herein, the input machine learning model comprises a machine learning model that is being developed for deployment in a production environment but that is not yet deployed in the production environment. The production environment may include an entity, such as a bank or healthcare provider, planning to use the machine learning model with customer data to perform tasks such as credit evaluation, risk analysis, user identification, fraud detection, healthcare exam analysis, healthcare diagnosis, healthcare image recognition, etc. Step 410 may be performed, in one example, in the manner described with respect to block 300 of FIG. 3.

At step 415, the system (e.g., server 210) creates a feature vector based on metadata of the input machine learning model and a data source used by the input machine learning model. In embodiments, and as described herein, the data module 220 creates a feature vector for the input machine learning model by analyzing metadata of the input machine learning model and one or more data sources used by the input machine learning model. In embodiments, and as described herein, the analyzing may comprise using feature extraction with the metadata and one or more data sources.

In an example, the creating the feature vector comprises: determining one or more techniques used by the input machine learning model by analyzing the metadata (e.g., as described at step 302 of FIG. 3); and including, in the feature vector, content based on the one or more techniques. In another example, the creating the feature vector comprises: determining one or more areas of use of the input machine learning model by analyzing the metadata and the data source (e.g., as described at step 302 of FIG. 3); and including, in the feature vector, content based on the one or more areas of use. In another example, the creating the feature vector comprises: identifying information in a knowledge base that is related to using the input machine learning model (e.g., as described at step 303 of FIG. 2); and including, in the feature vector, content based on the identified information in the knowledge base. In another example, the creating the feature vector comprises: identifying information in a regulation that is related to using the input machine learning model (e.g., as described at step 303 of FIG. 2); and including, in the feature vector, content based on the identified information in the regulation. In another example, the creating the feature vector comprises: identifying a type of sensitive information in the data source and used by the input machine learning model (e.g., as described at step 305 of FIG. 2); and including, in the feature vector, content based on the identified type of sensitive information. Creating the feature vector may comprise any combination of these examples.

At step 420, the system (e.g., server 210) determines a risk tier of the input machine learning model by classifying the input machine learning model into one of plural predefined tiers using the feature vector with a model-tiering machine learning model. In embodiments, and as described herein, the classification module 225 inputs the feature vector from step 415 into the model-tiering machine learning model, which outputs one of plural predefined tiers. In embodiments, and as described herein, the classification module 225 assigns the output one of plural predefined tiers as the risk tier for this particular input machine learning model. Step 420 may be performed, in one example, in the manner described with respect to block 306 of FIG. 3.

At step 425, the system (e.g., server 210) provides validation information to an evaluator wherein the validation information is based on the risk tier and is used to validate the input machine learning model in accordance with the risk tier. In embodiments, and as described herein, the validation information may comprise a timeline (e.g., deadline) to complete the validation and a scope of the validation. In embodiments, the scope of validation may include one or more of breadth, depth, priority, and frequency of validation activities. In embodiments, the validation activities may include one or more of review of documentation, review of developmental data, and performance and review of model validation testing such as backtesting, benchmarking, sensitivity testing, and stability testing. In embodiments, and as described herein, the system provides the validation information to the evaluator via the evaluator device 245. Upon receipt of the validation information, the evaluator may perform validation activities and determine a successful validation or an unsuccessful validation for the input machine learning model.

At step 430, the system (e.g., server 210) provides an indication of successful validation in response to successful validation by the evaluator or provides an indication of unsuccessful validation in response to unsuccessful validation by the evaluator. Based on a successful validation, the input machine learning model may be deployed in the production environment. Based on an unsuccessful validation, the input machine learning model may be returned to the developer for adjusting (e.g., fixing) the model.

As is understood from the foregoing disclosure, an aspect of the invention provides for a computer-implemented process for machine learning model tiering, the computer-implemented process comprising: in response to receiving as input a machine learning model, initializing the machine learning model in a platform for analysis, by separating the machine learning model into parts including data sources comprising test, training, validation, and metadata, and code; analyzing the metadata to identify characteristics of the machine learning model including purpose comprising natural language processing, image, transactional data, a black box as chatbot, and usage area including banking, and health; in response to converting data and the meta-data associated with the machine learning model, associated information including content from a predetermined knowledge base, and associated regulations, to a common space; comparing the data and the meta-data with the content; computing metrics including similarity and matching scores; identifying usage criteria including rules associated with regulations to provide safety of the users, and a business risk associated with usage of the machine learning model; mapping of the data sources and usage of the data by analyzing information including the code, text, metadata, and identifiers used for accessing a data source and the knowledge base; determining whether a data source used includes at least one of sensitive data, and restricted use data including gender, age, and postal code using a data classification pattern including: public, internal-only, confidential, and restricted; in response to a determination of the data source, classifying the machine learning model using a predetermined model-tiering machine learning model into a risk tier; setting permissions for an evaluator and deployment schedule corresponding to the risk tier associated with the machine learning model; in response to granting permission for the evaluator and information including assignment of a deadline to complete an assessment, approval indicia, and adjustments, analyzing metrics, information generated by evaluation tools, and computations by the evaluator to create annotations associated with the machine learning model; determining a disposition of the machine learning model using the annotations; in response to a positive disposition, indicating the machine learning model for deployment; and in response to a negative disposition, indicating the machine learning model for rework.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/ or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a processor set, an input machine learning model being developed for deployment in a production environment;
creating, by the processor set, a feature vector based on metadata of the input machine learning model and a data source used by the input machine learning model;
determining, by the processor set, a risk tier of the input machine learning model by classifying the input machine learning model into one of plural predefined tiers using the feature vector with a model-tiering machine learning model;
providing, by the processor set, validation information to an evaluator, wherein the validation information is based on the risk tier and is used to validate the input machine learning model in accordance with the risk tier, and wherein providing the validation information comprises granting time-limited permissions to access data associated with the input machine learning model;
receiving, by the processor set, a validation annotation associated with the input machine learning model, the validation annotation indicating a successful validation or an unsuccessful validation; and
selectively deploying, by the processor set, the input machine learning model in the production environment, the selectively deploying being performed based on the validation annotation.

2. The method of claim 1, wherein the creating the feature vector comprises:
determining one or more techniques used by the input machine learning model by analyzing the metadata; and
including, in the feature vector, content based on the one or more techniques.

3. The method of claim 1, wherein the creating the feature vector comprises:

determining one or more areas of use of the input machine learning model by analyzing the metadata and the data source; and
including, in the feature vector, content based on the one or more areas of use.

4. The method of claim 1, wherein the creating the feature vector comprises:
identifying information in a knowledge base that is related to using the input machine learning model; and
including, in the feature vector, content based on the identified information in the knowledge base.

5. The method of claim 1, wherein the creating the feature vector comprises:
identifying information in a regulation that is related to using the input machine learning model; and
including, in the feature vector, content based on the identified information in the regulation.

6. The method of claim 1, wherein the creating the feature vector comprises:
identifying a type of sensitive information in the data source and used by the input machine learning model; and
including, in the feature vector, content based on the identified type of sensitive information.

7. The method of claim 1, further comprising training the model-tiering machine learning model using labeled training data.

8. The method of claim 7, further comprising creating the labeled training data, wherein the labeled training data comprises plural data pairs each comprising a feature vector of a historic machine learning model and a label corresponding to one of the plural predefined tiers.

9. The method of claim 1, wherein the model-tiering machine learning model comprises one an artificial neural network model and an extreme gradient boost model.

10. The method of claim 1, further comprising one of:
providing an indication of successful validation in response to the successful validation by the evaluator; and
providing an indication of unsuccessful validation in response to the unsuccessful validation by the evaluator.

11. A computer program product comprising one or more computer readable storage media having program instructions collectively stored on the one or more computer readable storage media, the program instructions executable to:
receive an input machine learning model being developed for deployment in a production environment;
create a feature vector based on metadata of the input machine learning model and a data source used by the input machine learning model;
determine a risk tier of the input machine learning model by classifying the input machine learning model into one of plural predefined tiers using the feature vector with a model-tiering machine learning model;
provide validation information to an evaluator, wherein the validation information is based on the risk tier and is used to validate the input machine learning model in accordance with the risk tier, and wherein the validation information comprises time-limited permissions to access data associated with the input machine learning model;
receive a validation annotation associated with the input machine learning model, the validation annotation indicating a successful validation or an unsuccessful validation; and selectively deploy the input machine learning model in the production environment based on the validation annotation.

12. The computer program product of claim 11, wherein the creating the feature vector comprises one or more operations selected from a group consisting of:

determining one or more techniques used by the input machine learning model by analyzing the metadata, and including, in the feature vector, content based on the one or more techniques;

determining one or more areas of use of the input machine learning model by analyzing the metadata and the data source, and including, in the feature vector, content based on the one or more areas of use;

identifying information in a knowledge base that is related to using the input machine learning model, and including, in the feature vector, content based on the identified information in the knowledge base;

identifying information in a regulation that is related to using the input machine learning model, and including, in the feature vector, content based on the identified information in the regulation; and identifying a type of sensitive information in the data source and used by the input machine learning model, and including, in the feature vector, content based on the identified type of sensitive information.

13. The computer program product of claim 11, wherein the program instructions are executable to train the model-tiering machine learning model using labeled training data, wherein the labeled training data comprises plural data pairs each comprising a feature vector of a historic machine learning model and a label corresponding to one of the plural predefined tiers.

14. The computer program product of claim 11, wherein the model-tiering machine learning model comprises one an artificial neural network model and an extreme gradient boost model.

15. The computer program product of claim 11, wherein the program instructions are executable to:

provide an indication of successful validation in response to the successful validation by the evaluator; and provide an indication of unsuccessful validation in response to the unsuccessful validation by the evaluator.

16. A system comprising:

a processor set, one or more computer readable storage media, and program instructions collectively stored on the one or more computer readable storage media, the program instructions executable to:

receive an input machine learning model being developed for deployment in a production environment;

create a feature vector based on metadata of the input machine learning model and a data source used by the input machine learning model;

determine a risk tier of the input machine learning model by classifying the input machine learning model into one of plural predefined tiers using the feature vector with a model-tiering machine learning model;

provide validation information to an evaluator, wherein the validation information is based on the risk tier and is used to validate the input machine learning model in accordance with the risk tier, and wherein the validation information comprises time-limited permissions to access data associated with the input machine learning model;

receive a validation annotation associated with the input machine learning model, the validation annotation indicating a successful validation or an unsuccessful validation; and selectively deploy the input machine learning model in the production environment based on the validation annotation.

17. The system of claim 16, wherein the creating the feature vector comprises one or more operations selected from a group consisting of:

determining one or more techniques used by the input machine learning model by analyzing the metadata, and including, in the feature vector, content based on the one or more techniques;

determining one or more areas of use of the input machine learning model by analyzing the metadata and the data source, and including, in the feature vector, content based on the one or more areas of use;

identifying information in a knowledge base that is related to using the input machine learning model, and including, in the feature vector, content based on the identified information in the knowledge base;

identifying information in a regulation that is related to using the input machine learning model, and including, in the feature vector, content based on the identified information in the regulation; and identifying a type of sensitive information in the data source and used by the input machine learning model, and including, in the feature vector, content based on the identified type of sensitive information.

18. The system of claim 16, wherein the program instructions are executable to train the model-tiering machine learning model using labeled training data, wherein the labeled training data comprises plural data pairs each comprising a feature vector of a historic machine learning model and a label corresponding to one of the plural predefined tiers.

19. The system of claim 16, wherein the model-tiering machine learning model comprises one an artificial neural network model and an extreme gradient boost model.

20. The system of claim 16, wherein the program instructions are executable to:

provide an indication of successful validation in response to the successful validation by the evaluator; and provide an indication of unsuccessful validation in response to the unsuccessful validation by the evaluator.

* * * * *